United States Patent
Wada

(10) Patent No.: US 9,382,408 B2
(45) Date of Patent: Jul. 5, 2016

(54) RUBBER COMPOSITION FOR TIRE RIM CUSHION OR RUBBER FINISHING AND PNEUMATIC TIRE USING THE SAME

(71) Applicant: The Yokohama Rubber Co., LTD., Minato-ku, Tokyo (JP)

(72) Inventor: Tomoyuki Wada, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/419,203

(22) PCT Filed: Jul. 31, 2013

(86) PCT No.: PCT/JP2013/004626
§ 371 (c)(1),
(2) Date: Feb. 2, 2015

(87) PCT Pub. No.: WO2014/020909
PCT Pub. Date: Feb. 6, 2014

(65) Prior Publication Data
US 2015/0240060 A1    Aug. 27, 2015

(30) Foreign Application Priority Data
Aug. 2, 2012   (JP) .................. 2012-172271

(51) Int. Cl.
*C08K 3/04*   (2006.01)
*C08L 9/00*   (2006.01)
*B60C 1/00*   (2006.01)

(52) U.S. Cl.
CPC ... *C08L 9/00* (2013.01); *B60C 1/00* (2013.01); *B60C 2001/005* (2013.04); *C08K 2201/006* (2013.01); *C08K 2201/014* (2013.01)

(58) Field of Classification Search
CPC .......................................... C08L 9/00
USPC .......................................................... 524/496
See application file for complete search history.

(56) References Cited

FOREIGN PATENT DOCUMENTS

| JP | H06-080823 | | 3/1994 | |
| JP | 2005298612 A | * | 10/2005 | ................ C08L 7/00 |
| JP | 2006-056978 | | 3/2006 | |
| JP | 2006-063287 | | 3/2006 | |
| JP | 2006063287 A | * | 3/2006 | ................ C08L 9/00 |
| JP | 2008-138080 | | 6/2008 | |
| JP | 2008-273519 | | 11/2008 | |
| JP | 2011-046299 | | 3/2011 | |
| JP | 2011046299 A | * | 3/2011 | ................ B60C 1/00 |
| JP | 2012-031304 | | 2/2012 | |
| WO | WO 2012/144200 | | 10/2012 | |

OTHER PUBLICATIONS

Translation of JP2005-298612, Oct. 27, 2005.*
Translation of JP 2006-063287, Mar. 9, 2006.*
Translation of JP 2011-046299, Mar. 10, 2011.*
International Search Report dated Sep. 24, 2013 for International Application No. PCT/JP2013/004626, 4 pages, Japan.

* cited by examiner

*Primary Examiner* — Hui Chin
(74) *Attorney, Agent, or Firm* — Thorpe North & Western

(57) ABSTRACT

A composition formed by compounding from 55 to 75 parts by mass of a carbon black (1) having a nitrogen adsorption surface area of at least 35 m$^2$/g and less than 50 m$^2$/g and from 5 to 20 parts by mass of a carbon black (2) having a nitrogen adsorption surface area of at least 50 m$^2$/g and at most 95 m$^2$/g with 100 parts by mass of a rubber component including from 30 to 70 mass % of butadiene rubber having a cis-1,4 bond content of at least 97% and a Mooney viscosity (ML1+4) of at least 45 at 100° C., a ratio (T-cp)/(ML1+4) of the viscosity of a 5 mass % toluene solution at 25° C. (T-cp) [cps] to the Mooney viscosity being at least 2.0, and from 30 to 70 mass % of other diene rubbers; the total of the carbon blacks (1) and (2) being from 60 to 95 parts by mass.

12 Claims, No Drawings

RUBBER COMPOSITION FOR TIRE RIM CUSHION OR RUBBER FINISHING AND PNEUMATIC TIRE USING THE SAME

TECHNICAL FIELD

The present technology relates to a rubber composition for a tire rim cushion or rubber finishing and a pneumatic tire using the same. More particularly, the present technology relates to a rubber composition for a tire rim cushion or rubber finishing capable of achieving to a high degree low heat build-up as well as hardness, wear resistance, and setting resistance, and a pneumatic tire using the same.

BACKGROUND

Rubber for a tire rim cushion or rubber finishing sustains a strong compressive load in order to support the load of a vehicle, so there is a demand for the rubber hardness to be high. In addition, there is also a demand for the rubber to have properties such as resistance to permanent deformation (setting resistance) and wear resistance, even when undergoing compressive deformation.

On the other hand, increases in environmental awareness in recent years have led to a demand for improvements in fuel efficiency of tires. One means for reducing the heat build-up of rubber for a tire rim cushion or rubber finishing is a method of reducing the compounding ratio of fillers, but such a means causes a decrease in hardness and also diminishes the wear resistance.

Therefore, it has been very difficult to achieve at a high degree both low heat build-up as well as hardness, wear resistance, and setting resistance with conventional technology.

In Japanese Unexamined Patent Application Publication No. 2006-56978A, a rubber composition for a tire rim strip containing polybutadiene rubber having a specific viscosity ratio is disclosed. However, in the technology described in Japanese Unexamined Patent Application Publication No. 2006-56978A, it is not possible to satisfy both low heat build-up as well as hardness, wear resistance, and setting resistance at a high level.

SUMMARY

The present technology provides a rubber composition for a tire rim cushion or rubber finishing capable of achieving at a high degree low heat build-up as well as hardness, wear resistance, and setting resistance, and a pneumatic tire using the same.

As a result of conducting dedicated research, the present inventors discovered that the problem described above can be solved by compounding specific amounts of two types of carbon blacks having specific nitrogen adsorption surface areas with butadiene rubber having specific properties.

That is, the present technology is as follows.

1. A rubber composition for a tire rim cushion or rubber finishing formed by compounding from 55 to 75 parts by mass of a carbon black (1) having a nitrogen adsorption specific surface area of at least 35 $m^2/g$ and less than 50 $m^2/g$ and from 5 to 20 parts by mass of a carbon black (2) having a nitrogen adsorption specific surface area of at least 50 $m^2/g$ and at most 95 $m^2/g$ with 100 parts by mass of a rubber component including from 30 to 70 mass % of butadiene rubber having a cis-1,4 bond content of at least 97% and a Mooney viscosity (ML1+4) of at least 45 at 100° C., the ratio (T-cp)/(ML1+4) of the viscosity of a 5 mass % toluene solution at 25° C. (T-cp) [cps] to the Mooney viscosity being at least 2.0, and from 30 to 70 mass % of other diene rubbers; the total of the carbon blacks (1) and (2) being from 60 to 95 parts by mass.

2. The rubber composition for a tire rim cushion or rubber finishing according to 1 described above, wherein when the compounding ratio (mass) of the carbon black (2) is set to 1, the compounding ratio (mass) of the carbon black (1) is within a range of from 5 to 15.

3. The rubber composition for a tire rim cushion or rubber finishing according to 2 described above, wherein the compounding ratio (mass) of the carbon black (2) is set to 1, the compounding ratio (mass) of the carbon black (1) is within a range of from 5 to 10.

4. The rubber composition for a tire rim cushion or rubber finishing according to 1 described above, wherein the cis-1,4 bond content is at least 98%.

5. The rubber composition for a tire rim cushion or rubber finishing according to 1 described above, wherein the Mooney viscosity (ML1+4) is from 45 to 70.

6. The rubber composition for a tire rim cushion or rubber finishing according to 5 described above, wherein the Mooney viscosity (ML1+4) is from 50 to 70.

7. The rubber composition for a tire rim cushion or rubber finishing according to 1 described above, wherein the ratio (T-cp)/(ML1+4) is at least 2.0 and less than 3.3.

8. The rubber composition for a tire rim cushion or rubber finishing according to 7 described above, wherein the ratio (T-cp)/(ML1+4) is at least 2.2 and less than 2.5.

9. The rubber composition for a tire rim cushion or rubber finishing according to 7 described above, wherein the ratio (T-cp)/(ML1+4) is at least 2.3 and less than 2.5.

10. The rubber component for a tire rim cushion or rubber finishing according to 1 described above, wherein the rubber composition including from 40 to 50 mass % butadiene rubber and from 50 to 60 mass % other diene rubbers.

11. The rubber composition for a tire rim cushion or rubber finishing according to 1 described above, wherein the nitrogen adsorption specific surface area ($N_2SA$) of the carbon black (1) is from 35 to 45 $m^2/g$, and the nitrogen adsorption specific surface area ($N_2SA$) of the carbon black (2) is from 65 to 85 $m^2/g$.

12. The rubber composition for a tire rim cushion or rubber finishing according to 1 described above, wherein the compounding ratio of the carbon black (1) is from 60 to 70 parts by mass per 100 parts by mass of the rubber component; the compounding ratio of the carbon black (2) is from 5 to 15 parts by mass per 100 parts by mass of the rubber component; and the total compounding ratio of the carbon blacks (1) and (2) is from 65 to 85 parts by mass.

13. A pneumatic tire using the rubber composition of 1 described above for a rim cushion or rubber finishing.

With the present technology, two types carbon blacks having specific nitrogen adsorption specific surface areas are compounded in specific amounts with butadiene rubber having specific properties, so it is possible to provide a rubber composition for a tire rim cushion or rubber finishing capable of achieving at a high degree low heat build-up as well as hardness, wear resistance, and setting resistance, and a pneumatic tire using the same.

DETAILED DESCRIPTION

The present technology is explained in further detail below.
(Butadiene Rubber)

The butadiene rubber (BR) used in the present technology (called a specific BR hereafter) needs to have a cis-1,4 bond content of at least 97%, a Mooney viscosity (ML1+4) of at least 45 at 100° C., and a ratio (T-cp)/(ML1+4) of the viscosity of a 5 mass % toluene solution at 25° C. (T-cp) [cps] to the Mooney viscosity of at least 2.0. The effect of the present technology cannot be achieved if even one of the properties described above is not satisfied.

The cis-1,4 bond content is a value measured using a nuclear magnetic resonance device (NMR), and the cis-1,4 bond content is preferably at least 98%.

The Mooney viscosity is a value measured using an L-type rotor in accordance with JIS (Japanese Industrial Standard) 6300-1. The Mooney viscosity needs to be at least 45, which makes it possible to achieve both hardness and fuel efficiency. The Mooney viscosity is preferably at least 50. The upper limit of the Mooney viscosity is not particularly limited but is preferably at most 70.

The ratio (T-cp)/(ML1+4) serves as an index of the degree of branching of polymer chains of the BR. When the value is larger, the degree of branching is smaller, which means that the linearity is higher. When this value is less than 2.0, it is not possible to improve any of low heat build-up, hardness, wear resistance, or setting resistance. From the perspective of the effect of the present technology, the value of (T-cp)/(ML1+4) is preferably at least 2.0 and less than 3.3, more preferably at least 2.2 and less than 2.5, and particularly preferably at least 2.3 and less than 2.5.

Here, the toluene solution viscosity (T-cp) is obtained by dissolving a sample rubber in toluene as a 5 mass % solution and measuring the viscosity of the solution at 25° C. using a Cannon-Fenske viscometer.

(Other Diene Rubbers)

Examples of other diene rubbers used in the present technology include natural rubber (NR), isoprene rubber (IR), butadiene rubber other than the specific BR, styrene-butadiene copolymer rubber (SBR), and acrylonitrile-butadiene copolymer rubber (NBR). One of these may be used alone, or two or more may be used in any combination. Additionally, a molecular weight and a microstructure of the rubber component are not particularly limited and may be terminally modified by an amine, amide, silyl, alkoxysilyl, carboxyl, or hydroxyl group, or the like, or be epoxidated.

In the present technology, the specific BR needs to account for 30 to 70 mass % and the other diene rubbers needs to account for 30 to 70 mass % of a total of 100 parts by mass of the specific BR and the other diene rubbers (the total of the specific BR and the other diene rubbers is 100 parts by mass). When the specific BR is less than 30 mass %, the low heat build-up is diminished. Conversely, when the specific BR exceeds 70 mass %, the hardness or the breaking strength is diminished.

A preferable ratio of the specific BR and the other diene rubbers is from 40 to 50 mass % of the specific BR and from 50 to 60 mass % of the other diene rubbers.

(Carbon Black)

A feature of the present technology is that two types of carbon black having specific nitrogen adsorption surface areas are used in combination.

That is, in the present technology, a carbon black (1) having a nitrogen adsorption surface area ($N_2SA$) of at least 35 $m^2/g$ and less than 50 $m^2/g$ and a carbon black (2) having a nitrogen adsorption surface area ($N_2SA$) of at least 50 $m^2/g$ and at most 95 $m^2/g$ are used in combination.

When only one of the carbon blacks (1) or (2) is used, or when other carbon blacks other than the carbon blacks (1) and (2) are used, it becomes difficult to achieve at a high degree both low heat build-up and hardness, wear resistance, and setting resistance.

From the perspective of improving the effect of the present technology, a more preferable nitrogen adsorption specific surface area ($N_2SA$) of the carbon black (1) is from 35 to 45 $m^2/g$, and a more preferable nitrogen adsorption specific surface area ($N_2SA$) of the carbon black (2) is from 65 to 85 $m^2/g$.

The nitrogen adsorption specific surface area is a value measured in accordance with JIS K6217.

(Filler)

The rubber composition for a tire rim cushion or rubber finishing of the present technology may compound various fillers in addition to the carbon blacks described above. The fillers are not particularly limited and may be selected appropriately depending on the application, but examples include inorganic fillers such as silica, clay, talc, and calcium carbonate.

(Compounding Ratio of the Rubber Composition for a Tire Rim Cushion or Rubber Finishing)

The rubber composition for a tire rim cushion or rubber finishing of the present technology is formed by compounding from 55 to 75 parts by mass of a carbon black (1) having a nitrogen adsorption specific surface area ($N^2SA$) of at least 35 $m^2/g$ and less than 50 $m^2/g$ and from 5 to 20 parts by mass of a carbon black (2) having a nitrogen adsorption specific surface area ($N^2SA$) of at least 50 $m^2/g$ and at most 95 $m^2/g$ with 100 parts by weight of the rubber component described above and the total of the carbon blacks (1) and (2) is from 60 to 95 parts by mass.

When the compounding ratio of the carbon black (1) is less than 55 parts by mass per 100 parts by mass of the rubber component, the hardness and wear resistance are diminished, whereas when the compounding ratio exceeds 75 parts by mass, it is not possible to achieve low heat build-up, and the setting resistance is also diminished.

When the compounding ratio of the carbon black (2) is less than 5 parts by mass per 100 parts by mass of the rubber component, the hardness is diminished, whereas when the compounding ratio exceeds 20 parts by mass, it is not possible to achieve low heat build-up, and the setting resistance is also diminished.

When the total of the carbon blacks (1) and (2) is less than 60 parts by mass, the hardness and wear resistance are diminished, whereas when the total exceeds 95 parts by mass, it is not possible to achieve low heat build-up, and the setting resistance is also diminished.

A more preferable compounding ratio of the carbon black (1) is from 60 to 70 parts by mass per 100 parts by mass of the rubber component.

A more preferable compounding ratio of the carbon black (2) is from 5 to 15 parts by mass per 100 parts by mass of the rubber component.

A more preferable total compounding ratio of the carbon blacks (1) and (2) is from 65 to 85 parts by mass.

In addition, regarding the quantitative ratio of the compounding ratios of the carbon blacks (1) and (2), when the compounding ratio of the carbon black (2) is set to 1 (mass), the compounding ratio of the carbon black (1) is preferably from 5 to 15 (mass) and more preferably from 5 to 10 (mass) from the perspective of further enhancing the effect of the present technology, that is from the perspective of achieving at a high degree both low heat build-up and hardness, wear resistance, and setting resistance.

In addition to the aforementioned components, the rubber composition for a tire rim cushion or rubber finishing of the present technology may also contain various types of additives that are commonly added for rubber compositions, such as vulcanizing or cross-linking agents, vulcanizing or cross-linking accelerators, various types of oils, antiaging agents, plasticizers, and the like. The additives may be kneaded in accordance with a general method and used in vulcanizing or cross-linking as a composition. Compounded amounts of these additives may be any conventional standard amount, so long as the object of the present technology is not hindered.

In addition, the rubber composition for a tire rim cushion or rubber finishing of the present technology may also be used to produce a pneumatic tire in accordance with a conventional method for producing pneumatic tires.

The rubber composition of the present technology is able to achieve at a high degree both low heat build-up and hardness, wear resistance, and setting resistance and is therefore particularly useful for a tire rim cushion or rubber finishing.

EXAMPLES

The present technology is further explained in detail with reference to the Working Examples and Comparative Examples described hereinafter, but the present technology is not limited to these examples.

Working Examples 1 to 6 and Comparative Examples 1 to 11

Preparation of Samples

According to the formulation (parts by mass) shown in Table 1, the components excluding the vulcanization accelerator and sulfur were kneaded for five minutes with a 1.5 liter sealed Banbury mixer. The master batch was then discharged at a temperature of 150° C. and cooled to room temperature. This master batch was then kneaded for two minutes with a vulcanization accelerator and sulfur using a roller so as to obtain a rubber composition for a tire rim cushion or rubber finishing. Next, the rubber composition thus obtained was vulcanized in a predetermined mold at 160° C. for 20 minutes to fabricate a vulcanized rubber test strip. Then the vulcanized rubber test strip was subjected to the test methods shown below to measure the physical properties thereof.

Hardness: The shore A hardness at 20° C. was measured in accordance with JIS K6253. The results are shown as indices with the value of Comparative Example 1 being 100. Larger indices indicate higher hardness.

Heat build-up: The value of tan δ (60° C.) was measured under conditions with an initial distortion of 10%, an amplitude of ±2%, and a frequency of 20 Hz using a viscoelastic spectrometer made by Toyo Seiki Manufacturing Co. (Ltd.), and this value was used to evaluate heat build-up. The results are shown as indices with the value of Comparative Example 1 being 100. Smaller indices indicate reduced heat build-up.

Wear resistance: The amount of wear was measured using a pico abrasion tester in accordance with ASTM-D2228. The results are shown as indices with the inverse of the value of Comparative Example 1 being 100. A larger index means that the wear resistance is superior.

Setting resistance: The setting resistance was measured under conditions with an initial distortion of 25% for 22 hours at 70° C. in accordance with JIS K6262. The results are shown as indices with the value of Comparative Example 1 being 100. A larger index indicates that the setting resistance is superior.

The results are also shown in Table 1.

TABLE 1

|  | Comparative Example 1 | Comparative Example 2 | Comparative Example 3 | Comparative Example 4 | Comparative Example 5 |
|---|---|---|---|---|---|
| NR *1 | 50 | 50 | 50 | 50 | 50 |
| BR-1 *2 | — | — | — | — | — |
| BR-2 *3 | — | — | — | — | — |
| BR-3 *4 | — | — | — | — | — |
| BR-4 *5 | 50 | 50 | 50 | 50 | 50 |
| Carbon Black-1 *6 | — | 10 | 60 | — | — |
| Carbon Black-2 *7 | 70 | 60 | — | 80 | 60 |
| Carbon Black-3 *8 | — | — | 10 | 25 | 30 |
| Carbon Black-4 *9 | — | — | — | — | — |
| Carbon Black-5 *10 | — | — | — | — | — |
| Zinc white *11 | 4 | 4 | 4 | 4 | 4 |
| Stearic acid *12 | 2 | 2 | 2 | 2 | 2 |
| Oil *13 | 8 | 8 | 8 | 8 | 8 |
| Sulfur *14 | 3 | 3 | 3 | 3 | 3 |
| Vulcanization accelerator *15 | 1 | 1 | 1 | 1 | 1 |
| Test results | | | | | |
| Hardness | 100 | 90 | 75 | 110 | 105 |
| Heat build-up | 100 | 95 | 80 | 110 | 105 |
| Wear resistance | 100 | 90 | 75 | 110 | 105 |
| Setting resistance | 100 | 105 | 110 | 90 | 90 |

|  | Comparative Example 6 | Comparative Example 7 | Comparative Example 8 | Comparative Example 9 | Comparative Example 10 |
|---|---|---|---|---|---|
| NR *1 | 50 | 50 | 50 | 50 | 50 |
| BR-1 *2 | 50 | — | — | — | — |
| BR-2 *3 | — | 50 | — | — | — |
| BR-3 *4 | — | — | 50 | — | — |
| BR-4 *5 | — | — | — | 50 | 50 |
| Carbon Black-1 *6 | — | — | — | — | — |
| Carbon Black-2 *7 | 60 | 60 | 60 | 60 | 40 |
| Carbon Black-3 *8 | 10 | 10 | 10 | — | 10 |
| Carbon Black-4 *9 | — | — | — | — | — |

TABLE 1-continued

| | | | | | |
|---|---|---|---|---|---|
| Carbon Black-5 *10 | — | — | — | 10 | — |
| Zinc white *11 | 4 | 4 | 4 | 4 | 4 |
| Stearic acid *12 | 2 | 2 | 2 | 2 | 2 |
| Oil *13 | 8 | 8 | 8 | 8 | 8 |
| Sulfur *14 | 3 | 3 | 3 | 3 | 3 |
| Vulcanization accelerator *15 | 1 | 1 | 1 | 1 | 1 |
| Test results | | | | | |
| Hardness | 90 | 95 | 95 | 105 | 70 |
| Heat build-up | 110 | 95 | 95 | 110 | 75 |
| Wear resistance | 90 | 105 | 105 | 105 | 75 |
| Setting resistance | 90 | 95 | 95 | 95 | 115 |

| | Working Example 1 | Working Example 2 | Working Example 3 | Working Example 4 | Working Example 5 | Working Example 6 |
|---|---|---|---|---|---|---|
| NR *1 | 50 | 50 | 50 | 30 | 50 | 50 |
| BR-1 *2 | — | — | — | — | — | — |
| BR-2 *3 | — | — | — | — | — | — |
| BR-3 *4 | — | — | — | — | — | — |
| BR-4 *5 | 50 | 50 | 50 | 70 | 50 | 50 |
| Carbon Black-1 *6 | — | — | — | — | — | — |
| Carbon Black-2 *7 | 60 | 55 | 75 | 60 | 55 | 75 |
| Carbon Black-3 *8 | 10 | 5 | 20 | 10 | — | 5 |
| Carbon Black-4 *9 | — | — | — | — | 5 | — |
| Carbon Black-5 *10 | — | — | — | — | — | — |
| Zinc white *11 | 4 | 4 | 4 | 4 | 4 | 4 |
| Stearic acid *12 | 2 | 2 | 2 | 2 | 2 | 2 |
| Oil *13 | 8 | 8 | 8 | 8 | 8 | 8 |
| Sulfur *14 | 3 | 3 | 3 | 3 | 3 | 3 |
| Vulcanization accelerator *15 | 1 | 1 | 1 | 1 | 1 | 1 |
| Test results | | | | | | |
| Hardness | 105 | 100 | 115 | 100 | 100 | 110 |
| Heat build-up | 90 | 85 | 95 | 90 | 80 | 100 |
| Wear resistance | 110 | 100 | 120 | 105 | 100 | 110 |
| Setting resistance | 105 | 105 | 100 | 105 | 110 | 105 |

*1: NR (RSS#1)
*2: BR-1 (Nipol BR-1220 manufactured by the Zeon Corporation; cis-1,4 bond content = 98%; Mooney viscosity (ML1 + 4) at 100° C. = 43; (T-cp)/(ML1 + 4) = 1.4)
*3: BR-2 (UBEPOL 230 manufactured by Ube Industries, Ltd.; cis-1,4 bond content = 98%; Mooney viscosity (ML1 + 4) at 100° C. = 38; (T-cp)/(ML1 + 4) = 3.1)
*4: BR-3 (UBEPOL 150L manufactured by Ube Industries, Ltd.; cis-1,4 bond content = 98%; Mooney viscosity (ML1 + 4) at 100° C. = 43; (T-cp)/(ML1 + 4) = 2.8)
*5: BR-4 (BR360L manufactured by Ube Industries, Ltd.; cis-1,4 bond content = 98%; Mooney viscosity (ML1 + 4) at 100° C. = 51; (T-cp)/(ML1 + 4) = 2.4)
*6: Carbon black-1 (Seast V manufactured by Tokai Carbon Co., Ltd.; $N_2SA = 27$ m$^2$/g; DBP oil absorption = 87 cm$^3$/100 g)
*7: Carbon black-2 (Seast SO manufactured by Tokai Carbon Co., Ltd.; $N_2SA = 42$ m$^2$/g; DBP oil absorption = 115 cm$^3$/100 g)
*8: Carbon black-3 (Seast N3 manufactured by Tokai Carbon Co., Ltd.; $N_2SA = 79$ m$^2$/g; DBP oil absorption = 101 cm$^3$/100 g)
*9: Carbon black-4 (product name THAIBLACK N330T manufactured by Thai Carbon Co., Ltd.; $N_2SA = 65$ m$^2$/g; DBP oil absorption = 77 cm$^3$/100 g)
*10: Carbon black-5 (product name Niteron #300IH manufactured by New Japan Chemical Carbon Co., Ltd.; $N_2SA = 115$ m$^2$/g, DBP oil absorption = 120 cm$^3$/100 g)
*11: Zinc oxide (Zinc Oxide #3, manufactured by Seido Chemical Industry Co., Ltd.)
*12: Stearic acid (Beads Stearic Acid, manufactured by NOF Corporation)
*13: Oil (Extract No. 4S, manufactured by Showa Shell Sekiyu K.K.)
*14: Sulfur ("Golden Flower" Oil Treated Sulfur Powder, manufactured by Tsurumi Chemical)
*15: Vulcanization accelerator (Noccelar CZ-G manufactured by Ouchi Shinko Chemical Industrial Co., Ltd.)

As is clear from Table 1 above, the rubber compositions for a tire rim cushion or rubber finishing prepared in Working Examples 1 to 6 were prepared by compounding two types of carbon blacks having specific nitrogen adsorption specific surface areas in specific amounts with butadiene rubber having specific properties, so it can be seen that the compositions are able to achieve at a high degree low heat build-up and hardness, wear resistance, and setting resistance in comparison to the rubber composition of Comparative Example 1. In particular, when the compounding ratio of the carbon black (2) was set to 1 (mass) in the quantitative ratio of the compounding ratios of the carbon blacks (1) and (2), it can be seen that Working Examples 1, 2, 4, and 5 in which the compounding ratio of the carbon black (1) was set within the range of from 5 to 15 (mass) are able to achieve at a high degree even lower heat build-up and hardness, wear resistance, and setting resistance.

In contrast, Comparative Example 2 is an example in which the carbon black (2) was not used and a carbon black having a lower nitrogen adsorption specific surface area ($N_2SA$) than that of the carbon black (1) was used, so the hardness and wear resistance were diminished.

Comparative Example 3 is an example in which the carbon black (1) was not used and a carbon black having a lower nitrogen adsorption specific surface area ($N_2SA$) than that of the carbon black (1) was used, so the hardness and wear resistance were diminished.

In Comparative Example 4, the compounding ratios of the carbon blacks (1) and (2) exceeded the upper limits prescribed by the present technology, so low heat build-up was not achieved, and the setting resistance was also diminished.

In Comparative Example 5, the compounding ratio of the carbon black (2) exceeded the upper limit prescribed by the present technology, so low heat build-up was not achieved, and the setting resistance was also diminished.

In Comparative Example 6, the Mooney viscosity (ML1+4) of the BR at 100° C. and (T-cp)/(ML1+4) were less than the lower limits prescribed by the present technology, so the hardness was diminished, and low heat build-up was not achieved. In addition, the wear resistance and setting resistance were also diminished.

In Comparative Example 7, the Mooney viscosity (ML1+4) of the BR at 100° C. was less than the lower limit prescribed by the present technology, so the hardness and setting resistance were diminished.

In Comparative Example 8, the Mooney viscosity (ML1+4) of the BR at 100° C. was less than the lower limit prescribed by the present technology, so the hardness and setting resistance were diminished.

Comparative Example 9 is an example in which the carbon black (2) was not used and a carbon black having a higher nitrogen adsorption specific surface area ($N_2SA$) than that of the carbon black (2) was used, so the low heat build-up and setting resistance were diminished.

In Comparative Example 10, the total compounding amount of the carbon blacks (1) and (2) was less than the lower limit prescribed by the present technology, so the hardness and wear resistance were diminished.

What is claimed is:

1. A tire rim cushion rubber composition or a rubber finishing rubber composition formed by compounding from 55 to 75 parts by mass of a carbon black (1) having a nitrogen adsorption surface area of at least 35 $m^2/g$ and less than 50 $m^2/g$ and from 5 to 20 parts by mass of a carbon black (2) having a nitrogen adsorption surface area of at least 50 $m^2/g$ and at most 95 $m^2/g$ with 100 parts by mass of a rubber component including from 30 to 70 mass % of butadiene rubber having a cis-1,4 bond content of at least 97% and a Mooney viscosity (ML1+4) of at least 45 at 100° C., a ratio (T-cp)/(ML1+4) of a viscosity of a 5 mass % toluene solution at 25° C. (T-cp) [cps] to the Mooney viscosity being at least 2.0, and from 30 to 70 mass % of other diene rubbers; the total of the carbon blacks (1) and (2) being from 60 to 95 parts by mass.

2. The tire rim cushion rubber composition or the rubber finishing rubber composition according to claim 1, wherein a compounding ratio (mass) of the carbon black (2) to the carbon black (1) is within a range of from 1:5 to 1:15.

3. The tire rim cushion rubber composition or the rubber finishing rubber composition according to claim 2, wherein the compounding ratio (mass) of the carbon black (2) to the carbon black (1) is within a range of from 1:5 to 1:10.

4. The tire rim cushion rubber composition or the rubber finishing rubber composition according to claim 1, wherein the cis-1,4 bond content is at least 98%.

5. The tire rim cushion rubber composition or the rubber finishing rubber composition according to claim 1, wherein the Mooney viscosity (ML1+4) is from 45 to 70.

6. The tire rim cushion rubber composition or the rubber finishing rubber composition according to claim 5, wherein the Mooney viscosity (ML1+4) is from 50 to 70.

7. The tire rim cushion rubber composition or the rubber finishing rubber composition according to claim 1, wherein the ratio (T-cp)/(ML1+4) is at least 2.0 and less than 3.3.

8. The tire rim cushion rubber composition or the rubber finishing rubber composition according to claim 7, wherein the ratio (T-cp)/(ML1+4) is at least 2.2 and less than 2.5.

9. The tire rim cushion rubber composition or the rubber finishing rubber composition according to claim 7, wherein the ratio (T-cp)/(ML1+4) is at least 2.3 and less than 2.5.

10. The tire rim cushion rubber composition or the rubber finishing rubber composition according to claim 1, wherein the rubber component includes from 40 to 50 mass % butadiene rubber and from 50 to 60 mass % other diene rubbers.

11. The tire rim cushion rubber composition or the rubber finishing rubber composition according to claim 1, wherein the nitrogen adsorption surface area ($N_2SA$) of the carbon black (1) is from 35 to 45 $m^2/g$, and the nitrogen adsorption surface area ($N_2SA$) of the carbon black (2) is from 65 to 85 $m^2/g$.

12. The tire rim cushion rubber composition or the rubber finishing rubber composition according to claim 1, wherein a compounding amount of the carbon black (1) is from 60 to 70 parts by mass per 100 parts by mass of the rubber component; a compounding amount of the carbon black (2) is from 5 to 15 parts by mass per 100 parts by mass of the rubber component; and a total compounding amount of the carbon blacks (1) and (2) is from 65 to 85 parts by mass.

* * * * *